United States Patent Office 3,428,369
Patented Feb. 18, 1969

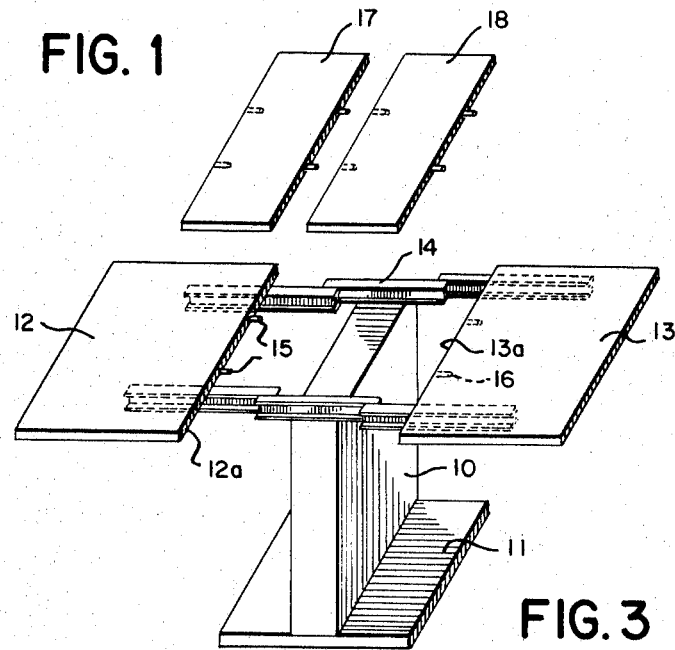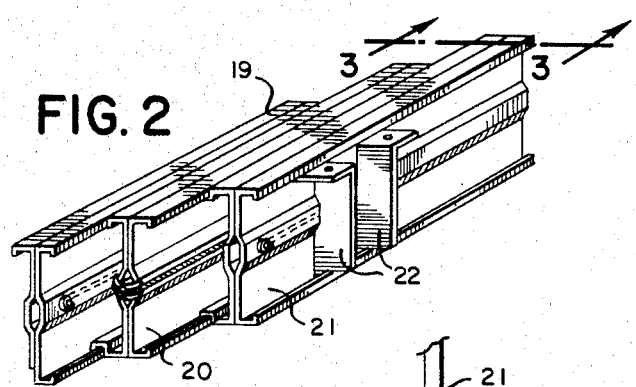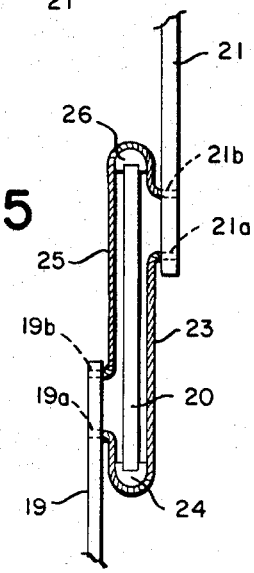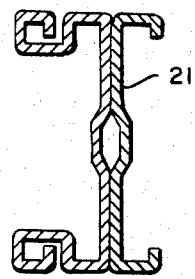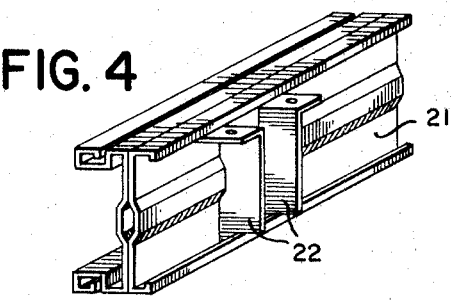

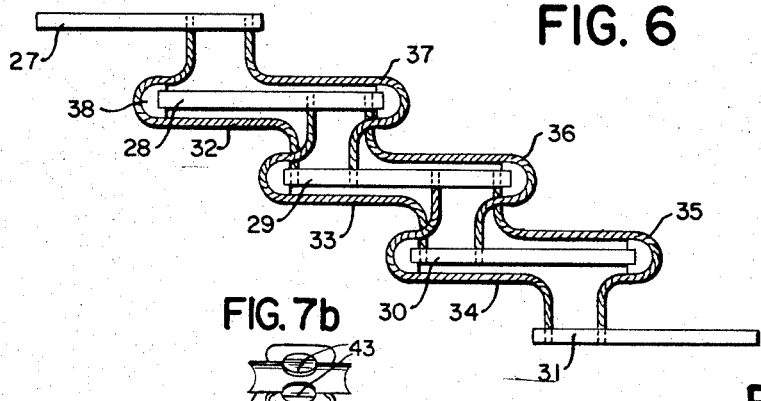
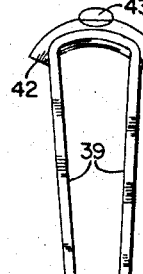
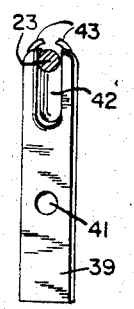
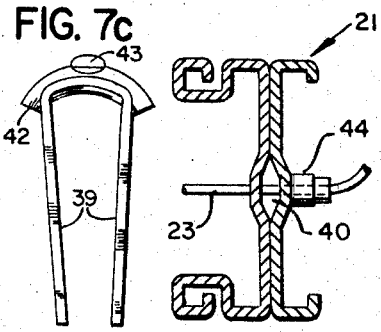
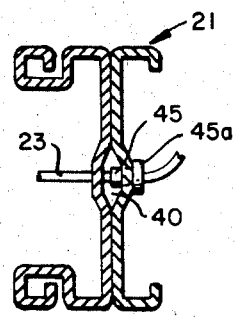
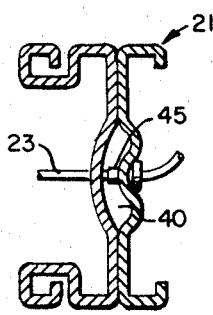
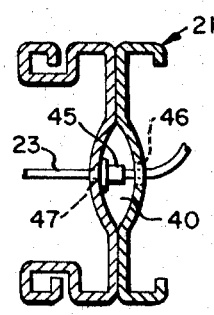
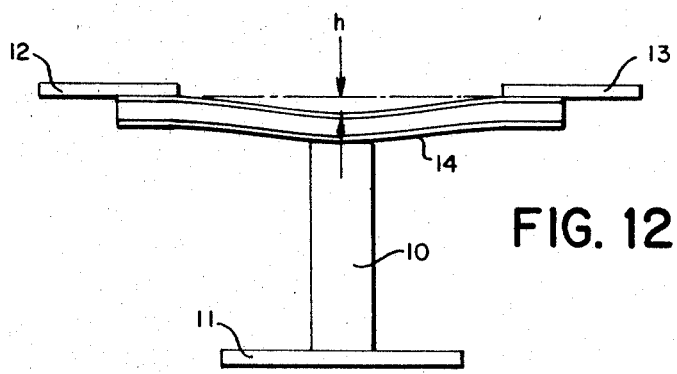

3,428,369
ARRANGEMENT FOR TELESCOPING SLIDES
Frank J. Kowack, Oceanside, N.Y., assignor to Columbian Slides Inc., Freeport, N.Y., a corporation of New York
Filed July 5, 1966, Ser. No. 562,679
U.S. Cl. 308—3.6                    11 Claims
Int. Cl. F16c 21/00, 29/00; F16g 11/06

ABSTRACT OF THE DISCLOSURE

Telescoping slides are constructed of a plurality of interlocking channel members movable relative to one another so that when any one channel member is moved in the direction for extending or contracting the slide, other channel members move correspondingly toward extending or contracting the slide. The slides are connected by cable means positioned below the top of the channel members. Means for guiding the cable means are included for those channel members interposed between two adjacent channel members.

---

The present invention relates to telescoping slides having a plurality of interlocking channel members, and in particular to an arrangement whereby the channel members may be made to move equally and automatically toward extending or contracting the slides.

Slides applicable to extensible tables, drawers, files and similar such articles, are well known in the art. In the development of such slides, it has been found that their utility is much enhanced if the slides are arranged so that when one of the channel members is moved toward extending or contracting the slide, all other channel members respond to such action and move automatically in a corresponding manner toward extending or contracting the slide. This particular feature is also useful when the slide is applied to pedestal type of tables, where any unbalance in the movement of the slide may cause the table to tilt.

Heretofore, arrangements for thus equalizing the movements of slides were comprised of combinations of gears, racks and pinions. These arrangements were unsatisfactory because the gears and pinions would drop out of mesh, the racks and pinions would often jam, and the mating teeth of the gears, racks and pinions, would often chip or break and exhibit excessive wear.

Accordingly it is an object of the present invention to provide a slide with an arrangement whereby all channel members of the slides move automatically and correspondingly in response to the movement of any one of the channel members.

Another object of the present invention is to provide an arrangement for slides, as set forth, which operates so that when any one channel member is moved toward extending or contracting the slide, all other channel members move similarly toward extending or contracting the slide.

Another object of the present invention is to provide an arrangement, as set forth, which is of simple construction in the form of cables and means for guiding same.

Yet another object of the present invention is to provide an arrangement for slides, as set forth, wherein the cables and means for guiding them are disposed so that they do not interfere with the free movement of the slide.

Still another object of the present invention is to provide an arrangement, as set forth, wherein the means for guiding the cables is of integral construction.

A further object of the present invention is to provide an arrangement, as set forth, which is adaptable to substantially large numbers of channel members in the slide.

A further object of the present invention is to provide an arrangement, as set forth, which when applied to extensible tables, prevents sagging of the table top.

A yet further object of the present invention is to provide an arrangement, as set forth, which results in reliable operation of the slides, and requires substantially no maintenance.

Still a further object of the present invention is to provide an arrangement, as set forth, which may be manufactured simply and economically.

With the preceding objective in view, the invention comprises a plurality of interlocking channel members movable in relation to one another so that the slide may be extended and contracted, cable means interconnecting the channel members and movable therewith, and means fixed to the channel members and guiding the cable means over the members so that when one channel member is moved in the direction for extending or contracting the slide, all other channel members move respondingly toward extending or contracting the slide.

The detailed description of the invention may be found in the following specifications taken in conjunction with the accompanying drawing in which:

FIGURE 1 is an isometric view showing the application of the slides to an extensible pedestal-type of table;

FIGURE 2 is an isometric view of the combined channel members of the slide, and shows the manner in which they are interlocked;

FIGURE 3 is a cross sectional view taken along line 3—3 in FIGURE 2, and shows the cross section of any one of the channel members;

FIGURE 4 is an isometric view, and shows a single channel member with provision for attaching the latter to a table or other base structure;

FIGURE 5 is a plan view showing, in diagrammatic form, three channel members interconnected with cables to obtain the equalizing arrangement, the channel members being shown widely separated from one another for purposes of clearly illustrating the equalizing arrangement;

FIGURE 6 is an extension of FIGURE 5 to include five channel members in the equalizing arrangement for the slides;

FIGURE 7a is a plan view of the means for guiding the cables;

FIGURE 7b is an elevational view of the means for guiding the cables;

FIGURE 7c is a side view of the means for guiding the cables;

FIGURE 8 is an elevational view showing one embodiment in which the cable is secured to a channel member by means of a lug located outside of the channel member;

FIGURE 9 is an elevational view and shows another embodiment for securing the cable to a channel member; the securing lug being partially within the channel and partially outside of the channel;

FIGURE 10 is an elevational view of a third embodiment for securing the cable to a channel member by means of a lug, the channel having recess for seating the lug;

FIGURE 11 is an elevational view of a fourth embodiment for securing the cable to a channel member by means of a lug situated entirely within the channel member;

FIGURE 12 is an elevational view and shows the arrangement whereby the construction of the slides prevents sagging of a pedestal-type of table.

Referring to the drawing, the slides, according to the present invention, may be applied to a table of the construction shown in FIGURE 1. The table has a pedestal 10 supported by a base 11. The table top is composed of two sections 12 and 13. The slides 14 rest upon the pedestal and support the table top sections 12 and 13. The slides 14, therefore, serve as a coupling medium for the table top sections, and are generally fastened to the underside thereof. Although FIGURE 1 shows the use of three slides within one assembly, the invention is not restricted to this particular number, and a greater number of slides may be applied equally well.

When the table top is not extended and the table top is to occupy minimum area, edge 12a of the table corresponding to section 12 is in contact with the edge 13a of section 13. These two sections may be caused to further mate well so as to form a continuous top surface, by providing for dowels 15 to slide into openings 16 as the two sections are brought together. When the two sections are drawn apart, the open area left between edges 12a and 13a may be covered by leaves 17 and 18. These leaves are made of the same substance as the table top, and may be placed so that they rest upon and are supported by the slides. The leaves may also be equipped with dowels and corresponding holes so that a well-mated interface is obtained. Although two leaves are shown in FIGURE 1, any number of one or more is possible, depending upon the design and size desired.

When extended, the slide 14 appears as shown in FIGURE 2. The slide is typically constructed of sheet metal channels which interlock with one another and the channel members slide longitudinally in relation to one another. When the slide is extended, the channels 19, 20 and 21 compensate for the separation of the two table sections and provide the support required to maintain the two sections in their upright position. Brackets 22 are provided for fastening the slides to the underside of table top although other techniques for performing this function are possible.

In order for the table to be stable when it is in its extended condition, it is essential that the distance between edge 12a and the center of the pedestal be identical to the distance between edge 13a and the center of the pedestal. Any unbalance in this relationship will tend to cause the table to be unstable and to tilt. Although it is possible to adjust each table section separately in order to obtain a balanced relationship, the normal user is unable to judge, by eye, whether such balance prevails with sufficient accuracy. Aside from this problem, the adjustment procedure for obtaining such balance, either by eye or by measuring scale, is, at best a tedious and annoying one.

Through the use of the slide arrangement shown in FIGURE 5, it is possible to move apart one section of the table and have the other section move automatically by the same amount in the opposite direction so as to preserve a proper balance at all times. For example, when the user contacts section 12 and moves the latter away from the center of the pedestal, section 13 moves simultaneously from the pedestal also, and without requiring the user to touch or move that section in any manner.

To illustrate the principle by which the slide is extended equally through the extending movement of one of its channels, FIGURE 5 is represented in diagrammatic form wherein the separating distance between the slides is exaggerated. Attached to the channel 19 at the location 19a, is a cable 23. The cable 23 passes over a sheave or adapter 24 associated with channel 20, and terminates in channel 21 where it is fixed to the location 21a. A second cable is similarly fixed, at one end, to channel 19 at location 19b, and is passed over the adapter 26. The other end of cable 25 terminates and is fixed at the position 21b of channel 21. The adapters 24 and 26 serve as means for guiding the cable along the directed path.

If, now, channel member 20 is considered fixed to, for example, the pedestal of the table, and channel 19 is moved in the direction for extending the slide, channel 21 will immediately and simultaneously move in the opposite direction. In this manner, channels 19 and 21 bear the same relationship with respect to channel 20, at all times. Thus, any movement of the channel 19 will cause the overall dimension of the slide to change by double the amount of such movement.

The principle upon which such equalization of the slide is realized, may be seen from the following considerations. Assuming slide 20 fixed as described supra, and channel 19 is moved so as to extend the slide, the end, at location 19b, of cable 25 is moved along with the channel 19. The cable 25 is thus placed under tension, and as a result it exerts a force upon the channel 21 so that the latter becomes extended an equal amount. For example, due to the arrangement of the guiding adapter 26 and the relative locations of the ends of the cable at 19b and 21b, the cable end at 21b must move upward by the same amount as the cable end at 19b moves downward, when viewed in the diagram of FIGURE 5.

The same relationship prevails when the slide is to be contracted from an extended condition. In this case, cable 23 becomes the functioning member. For example, assuming that channel 19 is moved upward in FIGURE 5, so as to contract the slide, the end of cable 23 at location 19a will move upward by the same amount. This upward motion of the end of the cable is transferred, along the latter, and to the location 21a, assuming again that channel 20 is fixed. The force exerted by the cable at location 21a is downward directed and, accordingly, the channel 21 moves downward by the same amount that channel 19 moves upward. The slide is, therefore, equally contracted due to the opposite movements of the two channel members. It should be noted that when cable 23 operates to contract the slide, cable 25 responds to this action in every respect and without resistance. Thus, any upward movement of the location 19b tends to produce slack in the cable 25 which is immediately taken up by the corresponding downward movement of the location 12b. The same situation prevails in reverse, with respect to the cables, when the slide is extended.

The principle illustrated with regard to FIGURE 5, is not confined to the application of three channel members. The principle may be simply extended to apply to slides with 5, 7, 9, etc., channels. This is apparent from the arrangement in FIGURE 6, in which the separation between the channels is even more exaggerated than that in FIGURE 5, in order not to obscure the illustration of the principle.

In FIGURE 6, the slide is composed of the five channel members 27, 28, 29, 30 and 31. They are interconnected by the six cables 32, 33, 34, 35, 36 and 37. These cables are passed over guide adapters 38, and the ends of the cables are fixed to the channels similarly to that described for FIGURE 3. Assuming the slide is to be contracted with channel 29 fixed to the pedestal of the table, any contracting movement of channel causes channel 28 to move in the same direction as channel 27, due to the force exerted by cable 32 on the guide adapter 38 on channel 28. The movement of channel 28 is, in turn, transmitted along cable 33 leading to channel 30. The force transmitted along the cable 33 is directed so that it moves channel 30 in a similar contracting manner towards center channel 29. At the same time, the contracting movement of channel 30 causes cable 34 to exert a force upon channel 31 so that the latter executes a contracting movement also. The net result of this configuration, therefore, is that when channel 27 is moved in a manner so as to contract the slide, all other channels respond to this motion and contract in a similar manner. The same effect is observable when the channel 27 is moved so as to expand the slide. In this case cables 35, 36 and 37 are the functioning members, and the forces are transmitted along these cables in the same manner as described for the situation of FIGURE 5. The net effect is, again, that any expanding motion of the channel member 27, results in corresponding expanding motions of all the other channel members. Although channel member 27 has been selected as the one that exerts the initiating movement, the results remain unaffected if any other of the channel members is selected for this purpose. The equalization principle may be applied to 3, 5, 7, 9, etc., channels in a slide.

The adapter for guiding the cables over the edges of the channels for the purpose of equalizing the slides, is shown in FIGURE 7a. The adapter is integrally constructed from a single strip of material. The adapter is provided with two arms 39 for attaching to the end of the channel by inserting them into the duct 40, as shown in FIGURE 2. The arms include holes 41 whereby they can be firmly fastened to the walls of the ducts 40 by similarly providing holes in these walls. The arms may also be made of spring material and separated so that when they are forced into the duct, they exert pressure against the internal walls of the duct to the extent that they are firmly seated without the application of further fastening devices. In this arrangement, therefore, no additional holes would be required in the wall of the duct, and the holes 41 may also be dispensed with.

The portion 42 bridging the arms, is shaped in form of a circular segment having a groove in which the cable can slide. FIGURE 7c shows the relationship between the groove and, for example, cable 23. Furthermore, to prevent the cable from inadvertently sliding or riding out of the groove, fingers 43 bear against one another to close the gap over the groove. Thus, once the cable is threaded through the opening formed by the groove and the fingers, it cannot drop out of the groove and become separated from the adapter. The fingers 43 are cut-out portions from the arms 39, and are bent outward from the arms and against each other. In this manner the integral configuration of FIGURE 7b is realized.

The adapter as herein described, is a simply manufactured and economical element. It may be applied in the place of the conventional rollers, sheaves, and similar type of cable bearing members. Its integral construction without moving parts, assures that it is a reliable element requiring no maintenance. It may be manufactured from such basic processes as stamping, piercing and forming.

The fastening of the ends of the cables to the channels as, for example, at locations 19a, 19b, 21a and 21b, shown in FIGURE 5, may be accomplished in any one of a number of ways. FIGURE 8 shows one embodiment in which the cable end is anchored by threading it through holes in opposite sides of the duct 40 within the channel, and crimping a lug 44 to the end of the cable so that it cannot slip back out of the holes. In the embodiment of FIGURE 9, a differently designed lug 45 is provided for the purpose of anchoring the end of the cable. The lug 45 extends partially into the duct 40, and only a relatively slim shoulder 45a remains on the external surface of the duct. With such an arrangement, therefore, no significant obstructions project along the exterior surface of the web of the channel.

A completely unobstructed surface may be obtained by resorting to the design of FIGURE 10 in which the area surrounding the hole containing the lug, is recessed to the extent that when the shoulder of the lug is dropped into it, the end of the shoulder is flush with the external surface of the duct.

Finally FIGURE 11 shows an embodiment in which one hole 46 is made sufficiently large so that a lug similar to the element 45, may pass freely through it. At the same time, the hole 47 is made only large enough to accommodate the diameter or thickness of the cable. In the arrangement of FIGURE 11, therefore, the cable is threaded through both holes 46 and 47, the lug is crimped onto the end of the cable, and the cable is retracted so that the lug is drawn into the duct from the outside of the hole 46. This arrangement is a preferred one because no portion of the lug is exposed to the exterior of the duct, and only two holes through the walls of the duct are required to effect the design.

From the structural arrangement of FIGURE 1, it is apparent that the ends of the slides carrying the table sections 12 and 13 are cantilevered. Accordingly, these table top sections will deflect downward due to their own weight as well as the weight of the slides. This deflecting situation will be aggravated by any weighty objects that may be placed on these areas of the table. The net results of these deflecting effects is that the table sags at both ends rather than being planar. Aside from being an unstable condition, such sagging at the ends of the table may cause spillage of food or fluids while the table is in use. This undesirable sagging feature of the table, however, may be corrected by resorting to the design of the slides in accordance with FIGURE 12.

In this arrangement, the slide is constructed so that its longitudinal axis has a concave curvature when viewed from above the table top. Any deflections at the ends of the table, therefore, will tend to force the longitudinal axis into a straight line. With the longitudinal axis tending towards this direction therefore, sagging of the slides and hence the table surface, will not prevail. The built-in curvature of the slides may therefore be looked upon as producing a pre-stressed effect which compensates for the deflection resulting from the loading of the slides. The size of the preformed arc as measured by the height $h$ varies in direct proportion to the length of the extended slide, and the gage of the metal employed in the construction of the slide.

While this invention has been described in some detail, it will be understood by those skilled in the art that variations and modifications may be made without departing from the spirit thereof or the scope of the following claims.

What is claimed is:

1. A slide comprising first, second and third interlocking channel members movable in relation to one another so that said slide may be extended and contracted, said second channel member being interposed between said first and third members; a first and second guiding means each secured to one end of said second channel member for guiding movable cable; the guiding means comprising two arms and a bridge portion connecting said arms, said bridge portion having a groove wherein cable is slidable, and said bridge portion having fingers adapted to approach one another to form a partial closure over the groove; a first cable means secured at one end to said first channel member and leading to said third channel member by way of said first guiding means, the other end of said first cable means being secured to said third channel member; and a second cable means secured at one end to said first channel member and leading to said third channel member by way of said second guiding means, the other end of said second cable means being secured to said third channel member, said cable means cooperating with said channel members so that when one channel member is moved in the direction for extending or contracting said slide, all other channel members move respondingly toward extending or contracting said slide, said cable means being fixed to said channel member at about the midpoint of said channel member.

2. A slide comprising a plurality of interlocking channel members movable in relation to one another so that said slide may be extended and contracted, adjacent channel members having interlocking flanges located at opposite sides of each channel member; cable means interconnecting said channel members and movable therewith so that when one channel member is moved in the direction for extending or contracting the slide, other channel members move correspondingly toward extending or contracting said slide, the cable means being positioned below the top of the channel members, the slide including means for guiding the cable means over a channel member interposed between two adjacent channel members, the guide means comprising two arms for securing said guiding means to said channel member, a bridge portion connecting said arms, said bridge portion having a groove wherein said cable means is slidable, and said bridge portion having fingers adapted to approach one another to form a partial closure over the groove, said means being fixed to said channel member at about the midpoint of said channel member.

3. The invention according to claim 2 wherein said bridge portion is a circular segment whereby said cable means is guided over said channel members, and wherein one arm is attached to each side of the bridge, the arms projecting equally from each side of the bridge.

4. A slide comprising a plurality of interlocking channel members movable in relation to one another so that said slide may be extended and contracted; cable means interconnecting said channel members and movable therewith so that when one channel member is moved in the direction for extending or contracting the slide, other channel members move correspondingly toward extending or contracting said slide, guiding means fixed to said channel members for guiding said cable means over said channel members, said guiding means comprising two arms for securing said guiding means to said channel members, and a bridge portion connecting said arms and being constructed integrally therewith, said bridge portion having a groove wherein said cable means is slidable, and said bridge portion including two fingers, said fingers projecting over said groove so that said cable sliding within said groove is prevented from becoming separated therefrom.

5. The invention as defined in claim 4, wherein said fingers are integrally constructed with said arms.

6. The invention as defined in claim 4 including a lug means fixed to said cable means for securing said cable means to said channel members, said cable means passing through said channel members and said lug means being located on one side of said channel members.

7. The invention according to claim 6, wherein said lug means extends partially into said channel and partially outside of said channel members.

8. The invention according to claim 7, wherein said channel members include a recess for seating the outside portion of said lug means, said recess having a hole through which said lug means extends into said channel members.

9. The invention as defined in claim 4 including a lug means fixed to said cable means for securing said cable means to said channel members, said lug means being situated within said channel members having a hole through which said cable means extends into said channel members to connect with said lug means.

10. The invention according to claim 9 wherein said hole is of the size which admits said cable means on one hand and blocks said lug means on the other hand, said channel members having another hole for admitting said lug means into the interior of said channel members.

11. The invention as defined in claim 4 wherein said interlocking channel members conform to an arc when extended, the height of said arc being dependent upon the extended length of said slide and the thickness of material from which said slide is constructed.

References Cited

UNITED STATES PATENTS

| | | | |
|---|---|---|---|
| 1,080,043 | 12/1913 | Bradner | 108—87 |
| 1,845,762 | 2/1932 | Newton et al. | |
| 1,884,037 | 10/1932 | Malone. | |
| 2,252,566 | 8/1941 | Hocher. | |
| 3,078,129 | 2/1963 | Beeck | 108—87 X |
| 3,336,882 | 7/1967 | Edelson | 308—3.6 |

CARROLL B. DORITY, JR., *Primary Examiner.*

U.S. Cl. X.R.

108—87; 24—135